United States Patent [19]

Agarwal et al.

[11] Patent Number: 5,608,450
[45] Date of Patent: Mar. 4, 1997

[54] VIDEO CONFERENCING SYSTEM WITH FAST PACKET LOSS RECOVERY

[75] Inventors: Rohit Agarwal, Beaverton; Michael J. Gutmann, Portland, both of Oreg.

[73] Assignee: Intel Corporation, Santa Clara, Calif.

[21] Appl. No.: 614,331

[22] Filed: Mar. 12, 1996

Related U.S. Application Data

[63] Continuation of Ser. No. 301,849, Sep. 7, 1994, abandoned.

[51] Int. Cl.$^6$ .................................................. H04N 7/15
[52] U.S. Cl. ............................ 348/19; 348/390; 348/15
[58] Field of Search .................................. 348/14, 13, 15, 348/19, 17, 415, 409, 390, 384, 466; H04N 7/15

[56] References Cited

U.S. PATENT DOCUMENTS

| | | | |
|---|---|---|---|
| 4,807,033 | 2/1989 | Keesen et al. | 348/466 |
| 4,827,339 | 5/1989 | Wada et al. | 348/390 |
| 4,935,953 | 6/1990 | Appel et al. | 348/19 |
| 4,989,088 | 1/1991 | Wada et al. | 348/415 |
| 4,996,594 | 2/1991 | Murayama | 348/409 |
| 5,014,267 | 5/1991 | Tompkins et al. | 370/62 |
| 5,365,265 | 11/1994 | Shibata et al. | 348/19 |
| 5,534,928 | 7/1996 | Iwamura | 348/466 |

FOREIGN PATENT DOCUMENTS

| | | | |
|---|---|---|---|
| 0181237 | 5/1986 | European Pat. Off. | 348/19 |

*Primary Examiner*—Victor R. Kostak
*Attorney, Agent, or Firm*—Blakely, Sokoloff, Taylor & Zafman

[57] ABSTRACT

A video system is disclosed that provides fast communication packet loss recovery. A source node generates a series of encoded video flames for a series of digitally sampled video flames by encoding each digitally sampled video frame relative to either an immediately preceding digitally sampled video frame or a previous digitally sampled video frame specified by a lost frame message received over the communication link from a destination node. The destination node receives the encoded video frames over the communication link and transfers the lost frame message to the source node if one of the encoded video frames is lost or delayed. The destination node generates the decoded version of each encoded video frame relative to either a decoded version of an immediately preceding encoded video frame or a decoded version of a last successfully received encoded video frame.

21 Claims, 6 Drawing Sheets

VIDEO CONFERENCING SYSTEM WITH FAST PACKET LOSS RECOVERY

This is a continuation of application Ser. No. 08/301,849, filed Sep. 7, 1994, now abandoned.

BACKGROUND OF THE INVENTION

1. Field of the Invention

The present invention pertains to the field of video systems. More particularly, this invention relates to a video conferencing system that provides fast recovery from losses of communication packets that contain compressed video data.

2. Background

Prior video conferencing systems typically comprise a set of video communication nodes coupled for communication over a communication link or communication network. Such video communication nodes typically exchange digital communication packets via the communication network. The digital communication packets usually contain digitized video and digitized audio information.

Typically in such systems, a source video communication node generates digitized video information by performing digital sampling on a video signal generated by a video camera. The source video communication node usually encodes the digitally sampled video signal by performing digital data compression on the incoming digital video bit stream from the video camera. The source communication node then typically packetizes and transmits the compressed video data to a destination communication node over the communication network. The destination video communication node typically receives the compressed video data over the communication network and reconstructs a decompressed version of the original digitally sampled video signal by decoding the compressed video data.

Typically in such systems, the digital video bit stream from the video camera comprises a series of real-time video frames. Each video frame usually comprises an array of video pixel information including color and intensity values that represent the original video scene sensed by the video camera. The source video communication node typically encodes each video frame relative to the immediately preceding video frame. For example, some prior systems encode each video frame by subtracting the video pixel information for the preceding video frame on a pixel by pixel basis. Such an encoded video frame is typically referred to as a delta frame. A compressed video frame that is not encoded relative to any other video frame is typically referred to as an intraframe.

The source video communication node typically segments such encoded video frames into packets and transmits the encoded packets to the destination video communication node over the communication network. The destination video communication link receives the encoded packets over the communication network and reassembles the encoded video frames. The destination communication node typically decodes the incoming delta frames by adding the delta frame data to the preceding video frame on a pixel by pixel basis.

In such a system, transmission errors on the communication network may cause the loss of encoded packets or the late arrival of encoded packets at the destination video communication node. Such packet losses usually prevent the destination video communication node from properly reassembling the series of encoded video frames. As a consequence, the destination video communication node cannot properly decode an incoming video frame that follows a lost video frame because the incoming video frame is encoded relative to the lost frame.

Some prior systems recover from such packet losses by transmitting an intraframe request from the destination communication node to the source communication node if a packet is lost or received out of sequence at the destination node. The intraframe request causes the source communication node to assemble an intraframe and transmit the intraframe to the destination video communication node over the communication link. The intraframe provides the destination communication node with a fresh basis for decoding subsequent video frames from the source video communication node. Unfortunately, such a system that employs intraframe requests typically suffers from high latency during packet loss recovery due to the time required to transmit the intraframe request from the destination video communication node to the source video communication node. In addition, the time required for the source video communication node to encode an intraframe increases the latency because intraframes are typically much larger than the delta flames that are lost.

Other prior systems perform packet loss recovery by periodically transmitting an intraframe from the source video communication node to the destination video communication node. Such a periodic transmission of intraframes regularly provides the destination video communication node with a fresh basis for decoding delta frames. Unfortunately, such periodic transmission of intraframes increases the overall bit rate required by the system on the communication network. Such an increased bit rate typically increases the cost of the communication network services and thereby increases the cost of video conferencing. Moreover, an increased bit rate typically slows other traffic on the communication network.

SUMMARY AND OBJECTS OF THE INVENTION

One object of the present invention to perform fast recovery from communication packet losses in a video communication system.

Another object of the present invention is to perform fast recovery from communication packet losses without significantly increasing the bandwidth utilization of a communication link by the communication system.

A further object of the present invention is to perform fast recovery from the late arrival of communication packets at a destination node on the communication link.

Another object of the present invention is to perform fast recovery from communication packet losses in a video communication system to enable real-time video conferencing at a relatively low bandwidth on the communication link.

Another object of the present invention is to perform fast recovery from communication packet losses by employing a lost frame message that specifies the last video frame successfully transferred in the video communication system.

Another object of the present invention is to perform fast recovery from communication packet losses by encoding and decoding video frames relative to the last video frame successfully transferred in the video communication system.

Another object of the present invention is to perform fast recovery from communication packet losses by storing a few preceding decoded video frames in source and destination nodes to enable encoding and decoding of video frames relative to the preceding decoded video frames.

These and other objects of the present invention are provided by a video system comprising a source node and a destination node coupled to a communication link. The source node generates a series of encoded video frames for a series of digitally sampled video flames by encoding each digitally sampled video frame relative to either an encoded and decoded version of an immediately preceding digitally sampled video frame or an encoded and decoded version of a previous digitally sampled video frame specified by a lost frame message received over the communication link. The source node transfers the encoded video frames over the communication link to the destination node. The destination node receives the encoded video frames over the communication link and transfers the lost frame message to the source node if one of the encoded video frames is lost or delayed. The destination node generates the decoded version of each encoded video frame by decoding each encoded video frame relative to either a decoded version of an immediately preceding encoded video frame or a decoded version of a last successfully received encoded video frame specified by the lost frame message.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
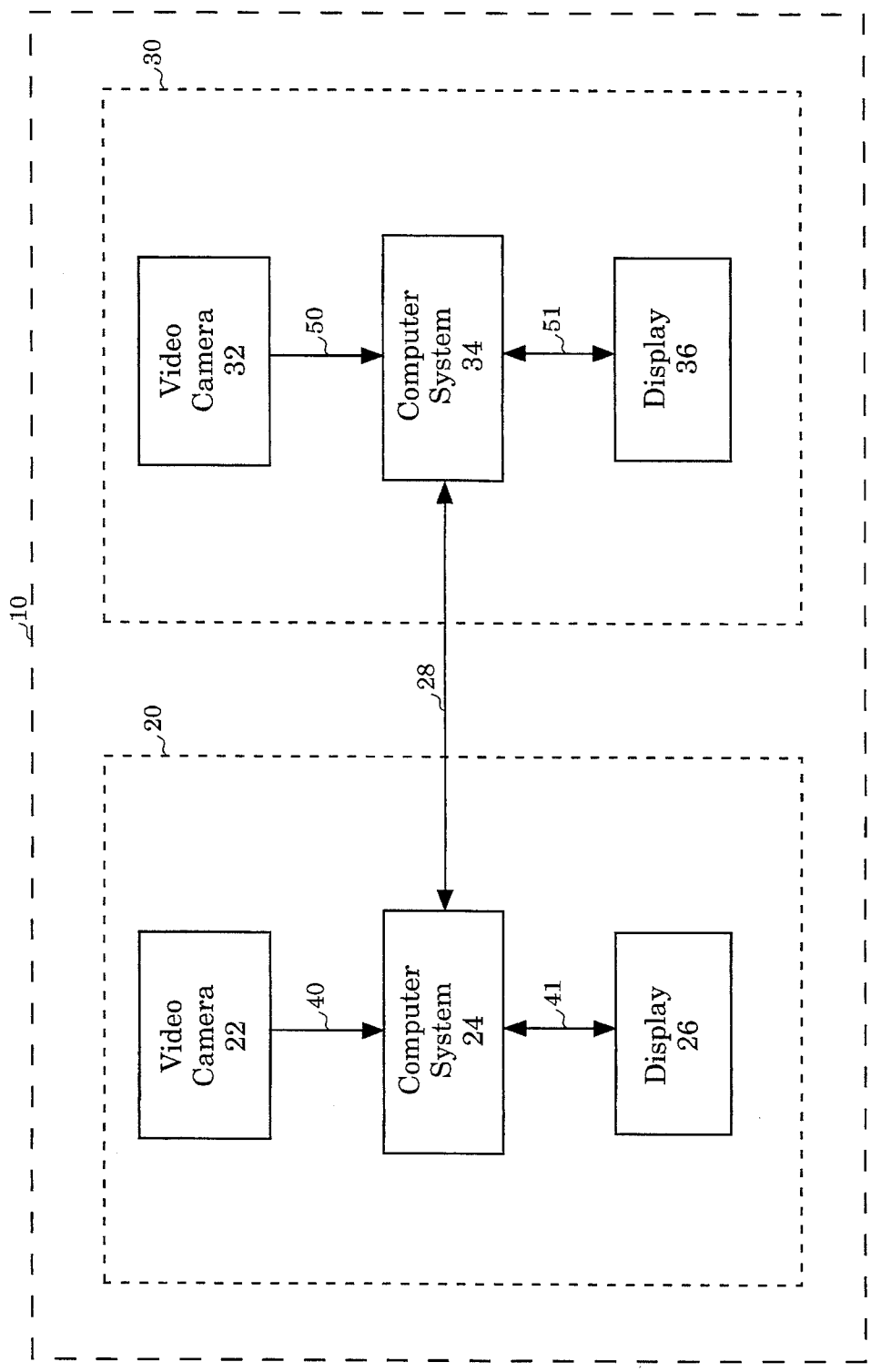
FIG. 1 illustrates a video conferencing system which comprises a pair of video communication nodes coupled for communication over a communication link.

FIG. 1 illustrates a video conferencing system 10. The video conferencing system 10 comprises a pair of video communication nodes 20 and 30 coupled for communication over a communication link 28. For one embodiment, the communication link comprises a local area network. For other embodiments, the communication link 28 comprises either a telephone line or an ISDN communication line.

The video conferencing system 10 provides for full duplex video conferencing between the video communication nodes 20 and 30. However, for purposes of illustration only transmission from the video communication node 20 to the video communication node 30 is described below because the transmission functions are symmetric. The video communication node 20 is hereinafter referred to as the source video communication node 20 and the video communication node 30 is hereinafter referred to as the destination communication node 30.

The source video communication node 20 comprises a video camera 22, a computer system 24, and a display 26. The computer system 24 receives a video signal from the video camera 22 over a video signal line 40. For one embodiment, the video signal received over the video signal line 40 comprises an analog video signal. For this embodiment, the computer system 24 performs analog to digital conversion to generate a digital video bit stream from the video camera 22. For another embodiment, the video signal received over the video communication line 40 from the video camera 22 comprises a digital video bit stream.

The computer system 24 encodes the digital video bit stream from the video camera 22 by performing data compression. The computer system 24 then transmits the compressed video bit stream over the communication link 28 in a packetized format.

For one embodiment, the digital video bit stream from the video camera 22 comprises a series of video frames FRAME [0] through FRAME[n]. The video frames FRAME[0] through FRAME[n] each include three planes including a Y plane, a U plane, and a V plane. The Y plane provides pixel by pixel video intensity values. The U and the V planes provide pixel by pixel color values.

The computer system 24 encodes each video frame FRAME[0] through FRAME[n] according to a data compression algorithm. The incoming video frames FRAME[0] through FRAME[n] represent a "sliding window" of video frames that overlay a continuous series of incoming video frames. The computer system 24 encodes an initial data frame as an intraframe. The computer system 24 then transmits the intraframe over the communication link 28 to the destination video communication node 30.

Thereafter, the communication system 24 encodes each subsequent video frame FRAME[1] through FRAME[n] by subtracting the decoded previous video frame on a pixel by pixel basis. The compressed video frames FRAME[1] through FRAME[n] are referred to as DELTA FRAME[1] through DELTA FRAME[n]. Each DELTA FRAME[1] through DELTA FRAME[n] is defined by the following equation:

$$DELTA\ FRAME[n] = VIDEO\ FRAME[n] - VIDEO\ FRAME[n-1]',$$
where VIDEO FRAME[n—1]' is the decoded version of the compressed video frame FRAME[n—1] \hfill (1)

The VIDEO FRAME[n—1] is not equal to VIDEO FRAME[n—1]' due to the loss caused by data compression.

The destination video communication node 30 comprises a video camera 32, a computer system 34, and a display 36. The computer system 34 receives the intraframe for the video frame FRAME[0] and DELTA FRAME[1] through DELTA FRAME[n] over the communication link 28. The computer system 34 decodes each video frame to generate decoded video frames VIDEO FRAME[0]' through FRAME [n]' according to the following equation:

$$VIDEO\ FRAME[n]' = VIDEO\ FRAME[n-1]' + DELTA\ FRAME[n] \quad (2)$$

The computer system 34 drives the reconstructed video signal defined by the decoded video frames VIDEO FRAME

[0]' through VIDEO FRAME[n]' to the display 36 over a video signal line 51. Similar video data compression and decompression techniques are employed for motion compensation.

Figure 2:
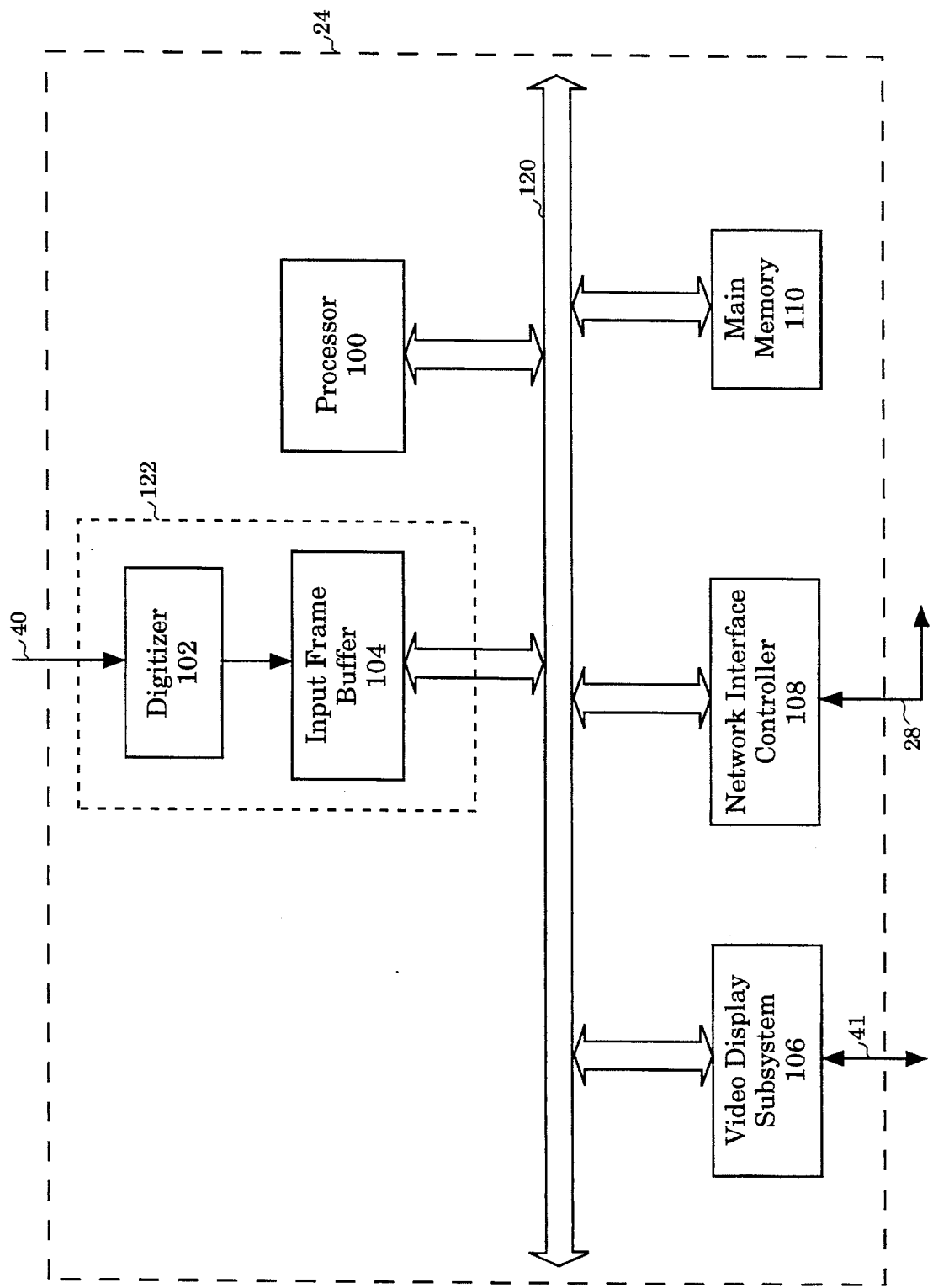
FIG. 2 illustrates a source communication node computer system for one embodiment which comprises a processor, a video input subsystem, a video display subsystem, a network interface controller, and a main memory.

FIG. 2 illustrates the computer system 24 for one embodiment. The computer system 24 comprises a processor 100, a video input subsystem 122, a video display subsystem 106, a network interface controller 108, and a main memory 110. The video input subsystem 122 comprises a digitizer 102, and an input frame buffer 104.

The digitizer 102 receives the analog video signal from the video camera 22 over the video signal line 40. The digitizer 102 digitizes the received analog video signal and transfers the digitized video signal into the input frame buffer 104. The input frame buffer 104 provides video storage for sampled and compressed video frames from the video camera 22 as well as storage areas for several preceding video frames.

The processor 100 reads the video frames FRAME[0] through FRAME[n] from the input frame buffer 104 and performs data compression to encode the video frames. The processor 100 transfers the compressed intraframe FRAME[0] and the compressed DELTA FRAME[1] through DELTA FRAME[n] to the network interface controller 108 over the system bus 120. The network interface controller 108 performs segmentation functions on the video frame bit stream received from the processor 100. The network interface controller 108 then performs packetized data transmission over the communication link 28.

In addition, the processor 100 generates a decoded VIDEO FRAME[0]' through VIDEO FRAME[n]' in the same manner as the destination communication node 30 decodes the compressed intraframe FRAME[0] and the compressed DELTA FRAME[1] through DELTA FRAME[n] according to EQ 2. The processor 100 stores the last few decoded frames VIDEO FRAME[0]' through VIDEO FRAME[n]' in the input frame buffer 104. The decoded frames stored in the input frame buffer 104 are employed during subsequent recovery after communication packet losses over the communication link 28.

The main memory 110 provides storage areas for an operating system of the computer system 24. The main memory 110 also provides storage areas for data structures for application programs and driver programs of the computer system 24.

For another embodiment, the main memory 110 serves as an input frame buffer in place of the input frame buffer 104. The digitizer 102 digitizes the received analog video signal and transfers the digitized video signal into the input frame buffer in the main memory 110. The input frame buffer in the main memory 110 provides video storage for sampled and compressed video frames from the video camera 22 as well as storage areas for several preceding video frames.

Figure 3:
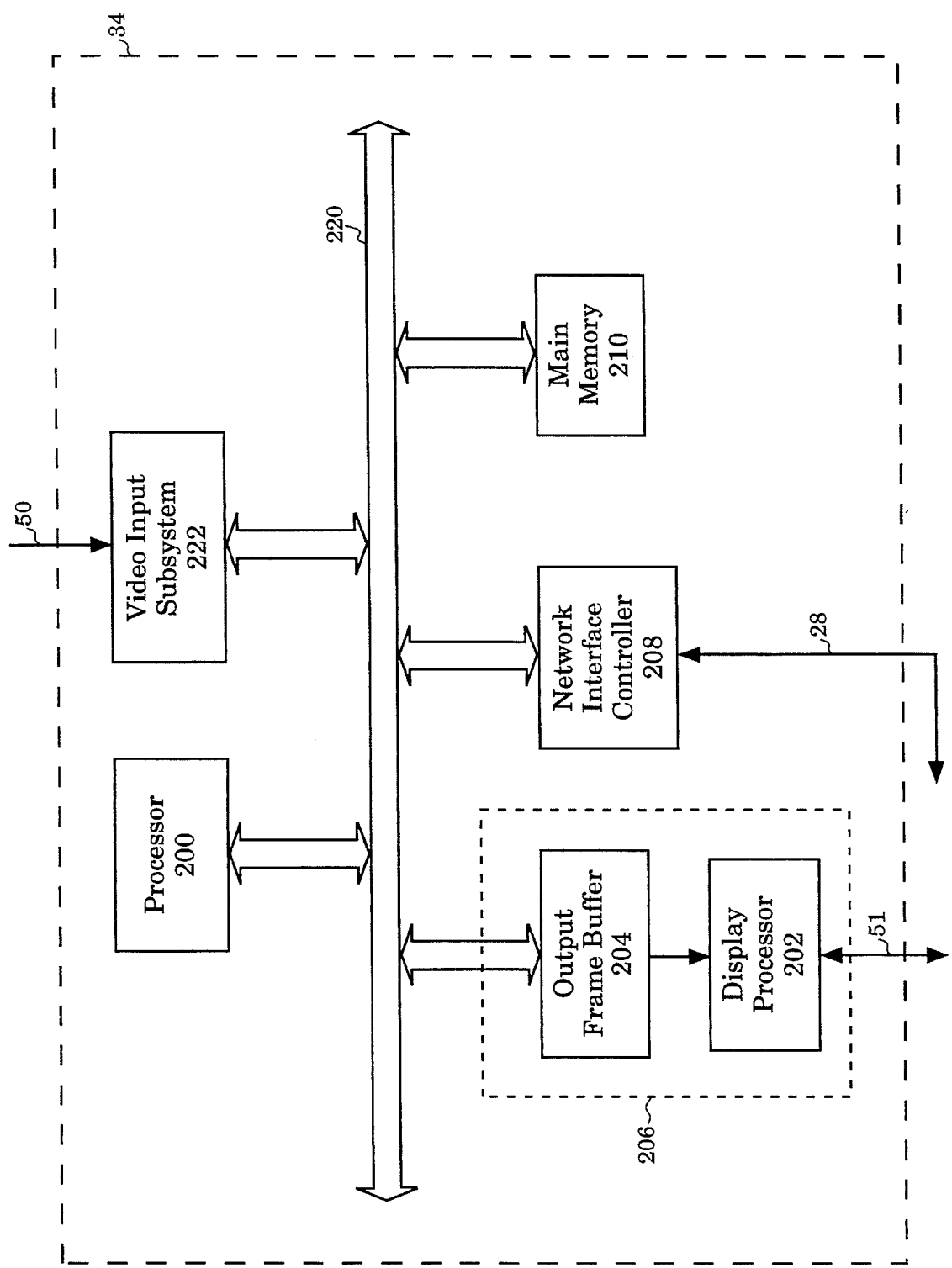
FIG. 3 illustrates a destination communication node computer system for one embodiment which comprises a processor, a video input subsystem, a video output subsystem, a network interface controller, and a main memory.

FIG. 3 illustrates the computer system 34 for one embodiment. The computer system 34 comprises a processor 200, a video input subsystem 222, a video output subsystem 206, a network interface controller 208, and a main memory 210. The video output subsystem 206 comprises an output frame buffer 204 and a display processor 202.

The network interface controller 208 receives communication packets over the communication link 28. The network interface controller 28 performs communication packet reassembly functions and assembles the received compressed intraframe FRAME[0] and the compressed DELTA FRAME[1] through DELTA FRAME[n].

The processor 200 reads the compressed frames from the network interface controller 208 over a system bus 220. The processor 200 generates the decoded video frames FRAME[0]' through FRAME[n]' by decompressing the incoming video frames from the network interface controller 208 according to EQ 2. The processor 200 then transfers each decoded video frame FRAME[0]' through FRAME[n]' into the output frame buffer 204. The display processor 202 reads the video frames from the output frame buffer 204 and generates a video signal for transfer to the display 36 over the video signal line 51.

The network interface controller 208 detects packet losses on the communication link 28 and notifies the processor 200 of the packet losses. addition, the processor 200 detects the loss of incoming video frames via a video frame sequence number transmitted by the source video communication node 20 along with each video frame over the communication link 28.

If the processor 200 determines that one of the compressed delta frames DELTA FRAME[1] through DELTA FRAME[n] has been lost, then the processor 200 causes the network interface controller 208 to transmit a lost frame message to the source video communication node 20 over the communication link 28. The lost frame message specifies the last delta frame number [0-n] successfully received by the processor 200.

The lost frame message is received by the network interface controller 108 over the communication link 28. The processor 100 receives the lost frame message from the network interface controller 108. The processor 100 then reads decoded video frame VIDEO FRAME[0]' through VIDEO FRAME[n]' stored in the input frame buffer 104 as specified by the lost frame message from the destination video communication node 30. The processor 100 uses the last successfully received VIDEO FRAME[0]' through VIDEO FRAME[n]' as specified by the lost frame message to encode the next delta frame for transfer over the communication link 28.

For another embodiment, the main memory 110 serves as an output frame buffer in place of the output frame buffer 204. The processor 200 transfers each decoded video frame FRAME[0]' through FRAME[n]' into the output frame buffer in the main memory 110. The display processor 202 reads the video frames from the main memory 110 and generates a video signal for transfer to the display 36 over the video signal line 51.

Figure 4:
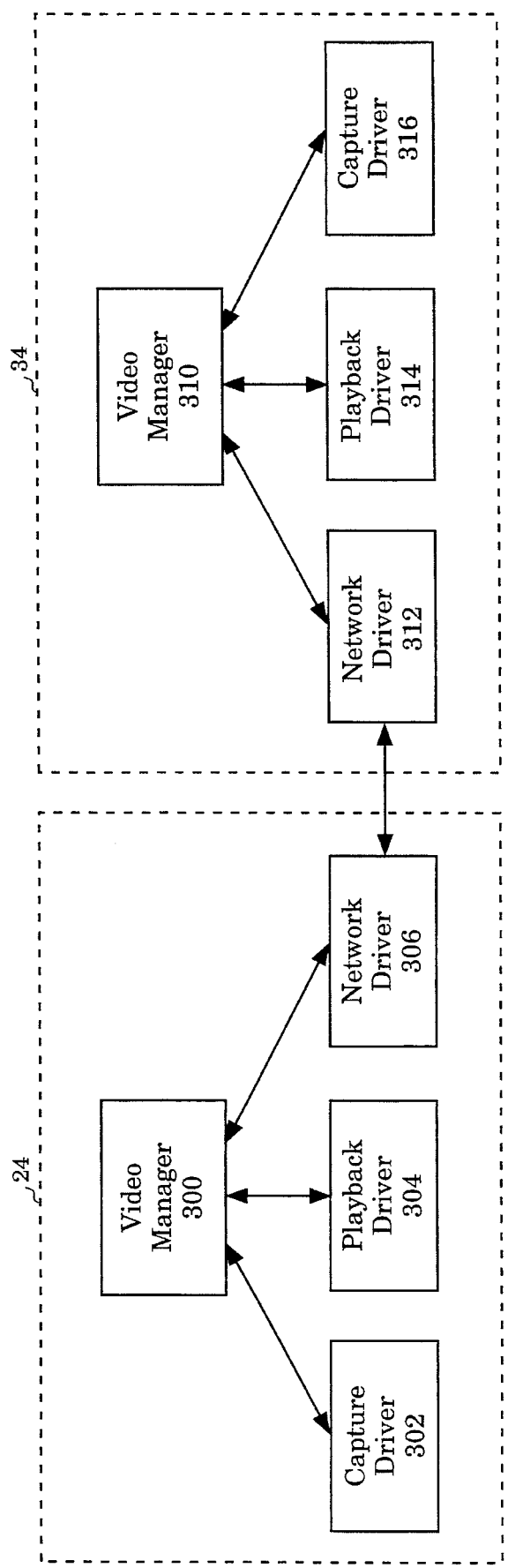
FIG. 4 illustrates the software architectures of the source and destination node computer systems including video managers, capture drivers, playback drivers, and network drivers.

FIG. 4 illustrates the software architectures of the computer systems 24 and 34. The software executing on the computer system 24 includes a video manager 300, a capture driver 302, a playback driver 304, and a network driver 306.

The video manager 300 executes on the processor 100. The video manager 300 samples data from the video camera 22 by reading video frames from the input frame buffer 104. The video manager 300 accesses the input frame buffer 104 via the capture driver 302.

The video manager 300 performs encoding and decoding functions on the video frame data video frames FRAME[0] through FRAME[n] from the input frame buffer 104 and transfers the compressed intraframe FRAME[0] and the compressed DELTA FRAME[1] through DELTA FRAME[n] to the network interface controller 108 via the network driver 306. The video manager 300 generates the decoded VIDEO FRAME[0]' through VIDEO FRAME[n]' according to EQ 2 and stores the last several decoded video frames for later access during packet loss recovery.

The software executing on the computer system 34 includes a video manager 310, a network driver 312, a playback driver 314, and a capture driver 316. The video manager 310 receives the incoming compressed intraframe FRAME[0] and the compressed DELTA FRAME[1] through DELTA FRAME[n] through the network interface controller 208 via the network driver 312. The video manager 310 decodes the incoming video frames and transfers the decoded VIDEO FRAME[0]' through VIDEO FRAME[n]' to the output frame buffer 204 via the playback driver 314.

Figure 5:
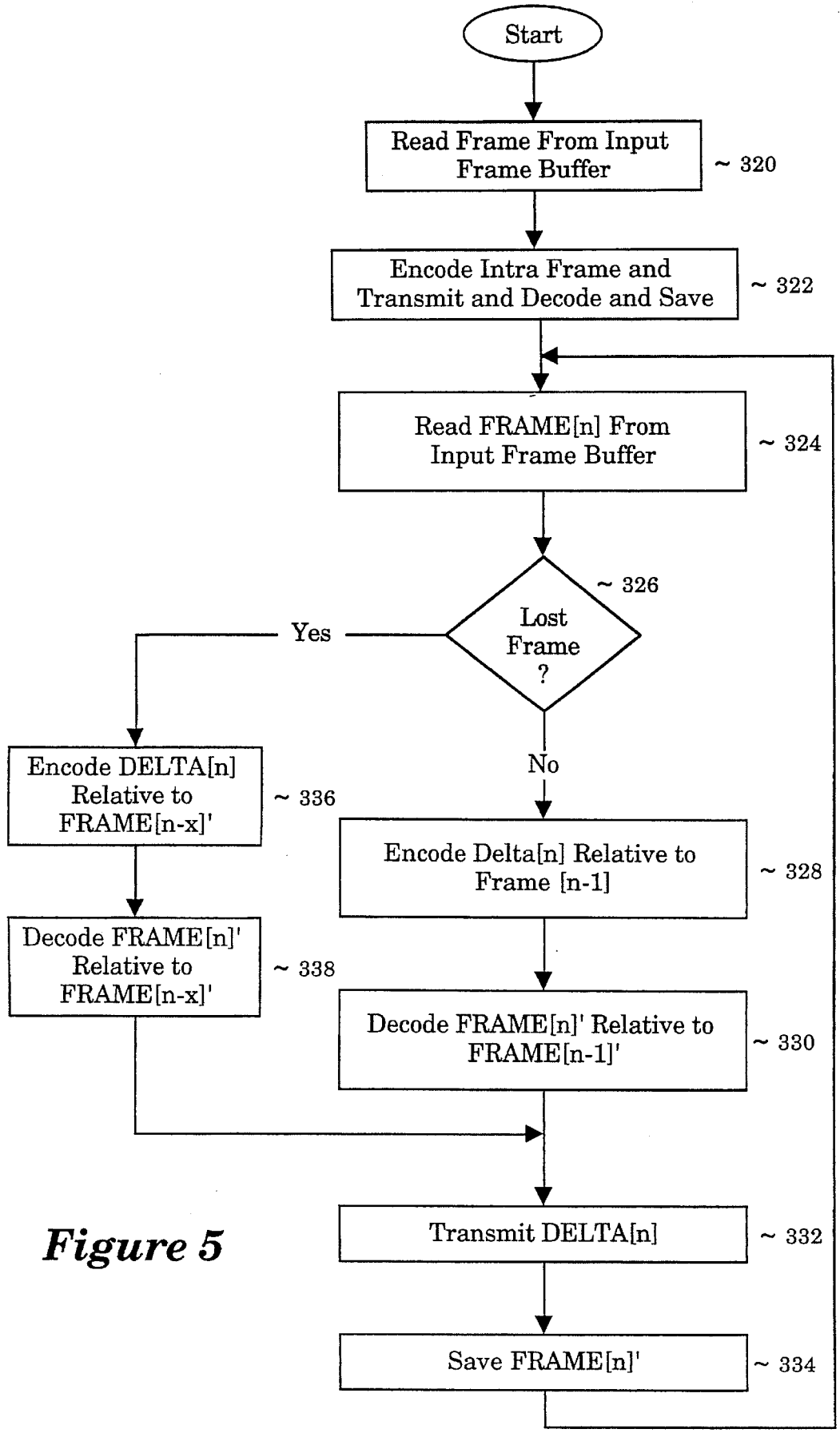
FIG. 5 is a flow diagram that illustrates the video frame source functions of the video manager of the source communication node for one embodiment.

FIG. 5 is a flow diagram that illustrates the video frame source functions of the video manager 300 for one embodiment. At block 320, the video manager 300 reads the initial video frame from the input frame buffer 104. Thereafter, at block 322 the video manager 300 encodes an intraframe for the initial video frame and transfers the intraframe to the network interface controller 108 for transmission over the communication link 28. At block 322 the video manager 300 also decodes the intraframe and saves the decoded intraframe in the input frame buffer 104.

At block 324 the video manager 300 reads a next video FRAME[n] from the input frame buffer 104. Thereafter, at decision block 326 the video manager 300 determines whether a lost frame message has been received from the video communication node 30. If the lost frame message was not detected at decision block 326 then control proceeds to block 328. Otherwise, control proceeds to block 336 to perform video recovery for the lost video frame.

At block 328, the video manager 300 generates the DELTA FRAME[n] relative to the decoded VIDEO FRAME[n-I]' according to EQ 1. Thereafter at block 330, the video manager 300 generates the decoded VIDEO FRAME[n]' relative to the decoded VIDEO FRAME[n—1 ]' according to EQ 2.

At block 332, the video manager 300 transfers the DELTA FRAME[n] to the network interface controller 108 for packetized transmission over the communication link 28. Thereafter, at block 334 the video manager 300 stores the decoded VIDEO FRAME[n]' in the input frame buffer 104. In this manner, the video manager 300 maintains a few decoded frames in the input frame buffer 104 for subsequent recovery from video transmission losses.

If a lost frame message was detected at decision block 326 then control proceeds to block 336. At block 336 the video manager 300 encodes DELTA FRAME[n] relative to decoded FRAME[n-x]' according to EQ 1 where x is specified by the received lost frame message from the destination video communication node 30 and indicates the last frame successfully received by the destination video communication node 30.

Thereafter at block 338, the video manager 300 decodes FRAME[n]' relative to decoded FRAME[n-x]' according to EQ 2 where x is specified by the lost frame message from the destination video communication node 30. Thereafter, control proceeds to block 332 to transmit the DELTA FRAME[n] and to save the decoded VIDEO FRAME[n]' in the input frame buffer 104.

Figure 6:
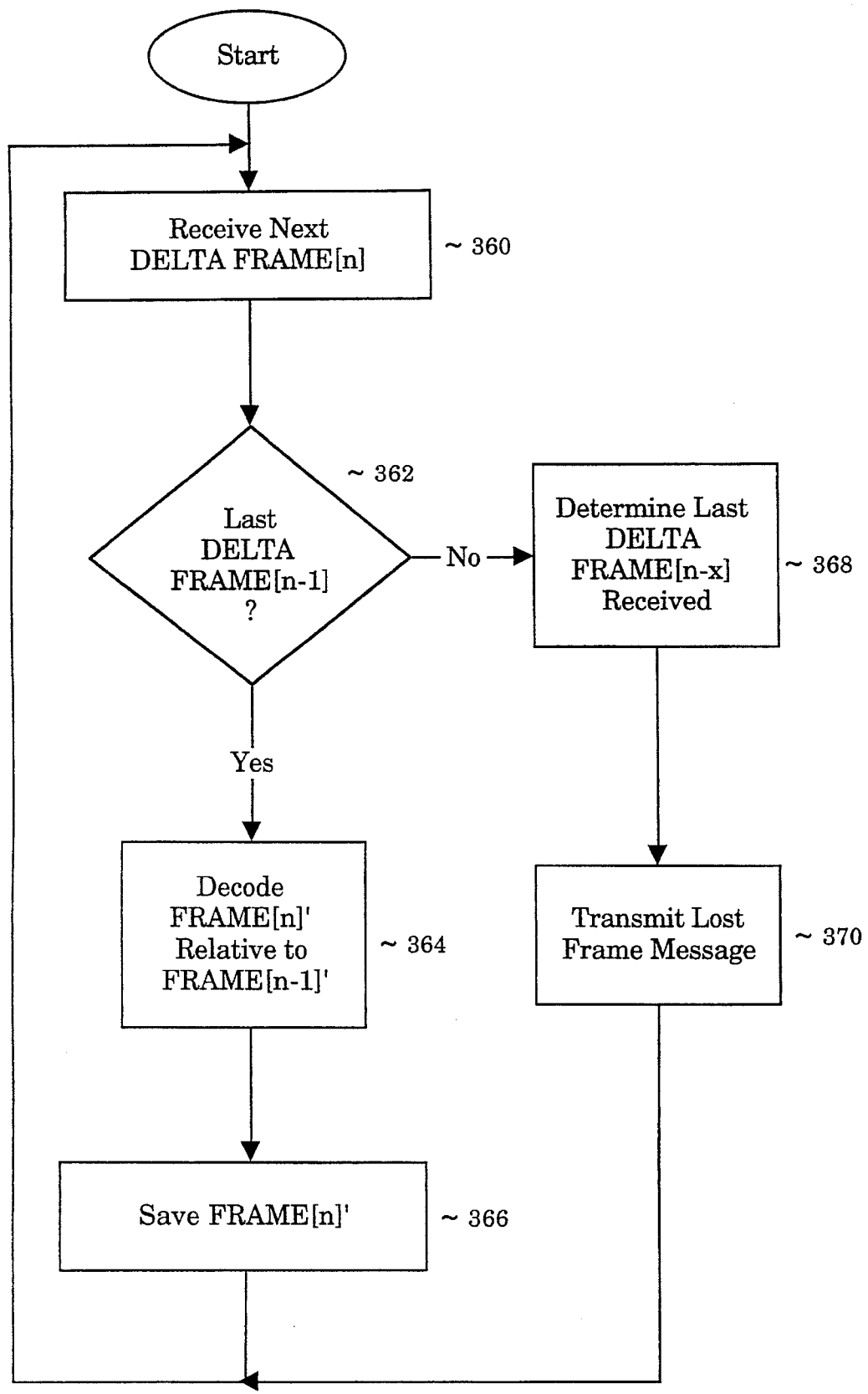
FIG. 6 is a flow diagram that illustrates the functions of the video manager for the destination communication node for one embodiment after the initial intraframe is received and decoded from the source video communication node.

FIG. 6 is a flow diagram that illustrates the destination video frame processing by the video manager 310 for one embodiment. The flow diagram illustrates the video manager 310 after the initial intraframe is received and decoded from the source video communication node 20.

At block 360, the video manager 310 accesses the next DELTA FRAME[n] received by the network interface controller 208 over the communication link 28. Thereafter at decision block 362, the video manager 310 determines whether the last DELTA frame received was the DELTA FRAME[n—1] i.e., the immediately preceding DELTA frame.

If the video manager 310 determines that the last DELTA frame received was the immediately preceding DELTA frame then control proceeds to block 364. At block 364, the video manager 310 generates the decoded VIDEO FRAME[n]' relative to decoded VIDEO FRAME[n—1]' according to EQ 2. Thereafter at block 366, the video manager 310 stores the decoded VIDEO FRAME[n]' in the output frame buffer 204 for rendering on the display 36 by the display processor 202.

At decision block 362, if the video manager 310 determines the last DELTA frame received was not the immediately preceding DELTA frame, i.e. that a frame was lost or arrived late on the communication link 28, then control proceeds to block 368. At block 368, the video manager 310 determines the last DELTA frame successfully received from the source video communication node 20. The last DELTA frame received is referred to as DELTA FRAME[n-x].

Thereafter at block 370, the video manager 310 transfers a lost frame message to the network interface controller 208 for transfer over the communication link 28. The lost frame message specifies the DELTA FRAME[n-x] as the last DELTA frame successfully received by the destination video communication node 30. The lost frame message causes the source video communication node 20 to transmit the next DELTA frame relative to the decoded VIDEO FRAME[n-x]' to recover the proper video signal.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A video system, comprising:

source node coupled to a communication link, the source node generating a series of encoded video frames for a series of digitally sampled video frames by encoding each digitally sampled video frame relative to either a decoded version of an immediately preceding digitally sampled video frame or a decoded version of a previous digitally sampled video frame specified by a lost frame message received over the communication link, the source node transferring the encoded video frames over the communication link;

destination node coupled to the communication link, the destination node receiving the encoded video frames over the communication link and transferring the lost frame message to the source node if one of the encoded video frames is lost or delayed; and the source node comprising a frame buffer, the frame buffer to store a plurality of previously digitally sampled video frames in decoded form, the plurality of previously digitally sampled video frames comprising the decoded version of the immediately preceding digitally sampled video frame and the decoded version of the previous digitally sampled video frame specified by the lost frame message, the source node using the decoded version of the immediately preceding digitally sampled video frame and the decoded version of the previous digitally sampled video frame specified by the lost frame message to compute an intercoded correction frame for a lost or delayed frame.

2. The video system of claim 1, wherein the destination node generates the decoded version of each encoded video frame by decoding each encoded video frame relative to either a decoded version of an immediately preceding encoded video frame or a decoded version of a last successfully received encoded video frame specified by the lost frame message.

3. The video system of claim 2, wherein the encoded video frames comprise an intraframe followed by a series of delta frames wherein each delta frame is encoded relative to an immediately preceding delta frame or to the intraframe.

4. The video system of claim 2, wherein the destination node includes a frame buffer that stores the decoded version of the immediately preceding encoded video frame and the decoded version of the last successfully received encoded video frame specified by the lost frame message.

5. The video system of claim 4, wherein the destination node generates the lost frame message by determining the last successfully received encoded video frame stored in the frame buffer if a communication packet is lost over the communication link.

6. The video system of claim 4, wherein the destination node generates the lost frame message by determining the last successfully received encoded video frame stored in the frame buffer if a communication packet arrives late at the destination node over the communication link.

7. The video system of claim 6, wherein the destination node determines whether the communication packet arrives late at the destination node over the communication link by examining a frame number for each encoded video frame received over the communication link.

8. A method for communication loss recovery in a video communication system, comprising the steps of:

generating a series of encoded video frames for a series of digitally sampled video frames;

transferring the encoded video frames over a communication link of the video communication system;

receiving the encoded video frames over the communication link and transferring a lost frame message over the communication link if one of the encoded video frames is lost or delayed wherein the lost frame message specifies a previous digitally sampled video frame as successfully received; and the step of generating a series of encoded video frames including the step of storing a plurality of previously digitally sampled video frames in decoded form, the plurality of previously digitally sampled video frames comprising a decoded version of the immediately preceding digitally sampled video frame and a decoded version of the previous digitally sampled video frame specified by the lost frame message the decoded version of the immediately preceding digitally sampled video frame and the decoded version of the previous digitally sampled video frame specified by the lost frame message used to compute an intercoded correction frame for a lost or delayed frame.

9. The method of claim 8, wherein the step of generating a series of encoded video frames for a series of digitally sampled video frames comprises the step of encoding each digitally sampled video frame relative to either a decoded version of an immediately preceding digitally sampled video frame or a decoded version of the previous digitally sampled video frame specified by the lost frame message.

10. The method of claim 9, further comprising the step of generating the decoded version of each encoded video frame by decoding each encoded video frame relative to either a decoded version of an immediately preceding encoded video frame or a decoded version of a last successfully received encoded video frame specified by the lost frame message.

11. The method of claim 10, wherein the encoded video frames comprise an intraframe followed by a series of delta frames wherein each delta frame is encoded relative to an immediately preceding delta frame or to the intraframe.

12. The method of claim 8, wherein the step of generating the decoded version of each encoded video frame includes the step of storing the decoded version of the immediately preceding encoded video frame and the decoded version of the last successfully received encoded video frame specified by the lost frame message into a frame buffer.

13. The method of claim 12, wherein the lost frame message is generated by determining the last successfully received encoded video frame stored in the frame buffer if a communication packet is lost over the communication link.

14. The method of claim 12, wherein the lost frame message is generated by determining the last successfully received encoded video frame stored in the frame buffer if a communication packet arrives late at the destination node over the communication link.

15. A video communication system with communication loss recovery, comprising:

means for generating a series of encoded video frames for a plurality of digitally sampled video frames;

means for transferring the encoded video frames over a communication link of the video communication system;

means for receiving the encoded video frames over the communication link and transferring a lost frame message over the communication link if one of the encoded video frames is lost or delayed wherein the lost frame message specifies a previous digitally sampled video frame as successfully received; and means for generating a series of encoded video frames comprising means for storing the plurality of digitally sampled video frames in decoded form, the plurality of digitally sampled video frames in decoded form comprising a decoded version of the immediately preceding digitally sampled video frame and a decoded version of the previous digitally sampled video frame specified by the lost frame message, the means for generating a series of encoded video frames further using the decoded version of the immediately preceding digitally sampled video frame and the decoded version of the previous digitally sampled video frame specified by the lost frame message to compute an intercoded correction frame for a lost or delayed frame.

16. The video communication system of claim 15, wherein the means for generating a series of encoded video frames for a series of digitally sampled video frames comprises means for encoding each digitally sampled video frame relative to either a decoded version of an immediately preceding digitally sampled video frame or a decoded version of the previous digitally sampled video frame specified by the lost frame message.

17. The video communication system of claim 16, further comprising means for generating the decoded version of each encoded video frame by decoding each encoded video frame relative to either a decoded version of an immediately preceding encoded video frame or a decoded version of a last successfully received encoded video frame specified by the lost frame message.

18. The video communication system of claim 17, wherein the encoded video frames comprise an intraframe followed by a series of delta frames wherein each delta frame is encoded relative to an immediately preceding delta frame or to the intraframe.

19. The video communication system of claim 15, wherein the means for generating the decoded version of each encoded video frame includes means for storing the decoded version of the immediately preceding encoded video frame and the decoded version of the last successfully received encoded video frame specified by the lost frame message into a frame buffer.

20. The video communication system of claim 19, wherein the lost frame message is generated by determining the last successfully received encoded video frame stored in the frame buffer if a communication packet is lost over the communication link.

21. The video communication system of claim 19, wherein the lost frame message is generated by determining the last successfully received encoded video frame stored in the frame buffer if a communication packet arrives late at the destination node over the communication link.

* * * * *

UNITED STATES PATENT AND TRADEMARK OFFICE
CERTIFICATE OF CORRECTION

PATENT NO. : 5,608,450

DATED : March 4, 1997

INVENTOR(S) : Agarwal et al.

It is certified that error appears in the above-identified patent and that said Letters Patent is hereby corrected as shown below:

Title page,

In the Abstract at [57] in line 3 delete "flames" and insert --frames--

In the Abstract at [57] in line 4 delete "flames" and insert --frames--

In column 2 at line 22 delete "flames" and insert --frames--

In column 3 at line 5 delete "flames" and insert --frames--

In column 4 at line 51 delete "FRAMEIn-1]" and insert --FRAME[n-1]--

In column 6 at line 12 insert --In-- following "losses." and prior to "addition,"

Signed and Sealed this

Twenty-ninth Day of July, 1997

Attest:

BRUCE LEHMAN

*Attesting Officer*    *Commissioner of Patents and Trademarks*